United States Patent
Boregowda et al.

(10) Patent No.: US 7,606,414 B2
(45) Date of Patent: Oct. 20, 2009

(54) FUSION OF COLOR SPACE DATA TO EXTRACT DOMINANT COLOR

(75) Inventors: Lokesh R. Boregowda, Bangalore (IN); Lalitha M. Eswara, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 718 days.

(21) Appl. No.: 11/223,224

(22) Filed: Sep. 9, 2005

(65) Prior Publication Data
US 2006/0204082 A1    Sep. 14, 2006

(30) Foreign Application Priority Data
Mar. 11, 2005 (IN) ............... 158/KOL/2005
Apr. 29, 2005 (IN) ............... 1060/DEL/2005

(51) Int. Cl.
G06K 9/00 (2006.01)
(52) U.S. Cl. .................................... 382/162
(58) Field of Classification Search ................ 382/162, 382/164, 165, 167, 168, 170, 171; 345/581, 345/589, 591, 594, 597, 604, 606; 348/587, 348/592, 649, 672
See application file for complete search history.

(56) References Cited

U.S. PATENT DOCUMENTS

| | | | |
|---|---|---|---|
| 6,721,446 B1 * | 4/2004 | Wilensky et al. | 382/162 |
| 6,865,302 B2 * | 3/2005 | Chang | 382/305 |
| 7,020,329 B2 * | 3/2006 | Prempraneerach et al. | 382/164 |
| 7,317,826 B2 * | 1/2008 | Wilensky et al. | 382/162 |

OTHER PUBLICATIONS

Gordon, Geoff , http://www-2.cs.cmu.edu/~ggordon/imageproc/gradview.html, (2004).
Greenhill, D. , et al., "Vigilant: Content-Querying of Video Surveillance Streams", *In: Video Based Surveillance Systems—Computer Vision and Distributed Processing*, Kluwer Academic Publishers,(2002),193-204.
Haritaoglu, Ismail , et al., "Backpack: Detection of People Carrying Objects Using Silhouettes", *The Proceedings of the Seventh IEEE International Conference on Computer Vision*, 1999., http://www.cs.berkeley.edu/~daf/appsem/Tracking/papers/haritaoglu99backpack.pdf,(1999),102-107.
Orwell, J. , et al., "Optimal Color Quantization for Real-Time Object Recognition", *Real-Time Imaging*, 7(5), (Oct. 2001),401-414.
Porikli, F. , et al., "Constrained video object segmentation by color masks and MPEG-7 descriptors", *Proceedings. 2002 IEEE International Conference on Multimedia and Expo*, 2002. ICME '02., (Aug. 2002),441-444.
Seaborn, Matthew , et al., "Fuzzy Colour Category Map for Content Based Image Retrieval", *British Machine Vision Conference*, vol. 1. (1999),103-112.

* cited by examiner

*Primary Examiner*—Jose L Couso
(74) *Attorney, Agent, or Firm*—Schwegman, Lundberg & Woessner, P.A.

(57) ABSTRACT

A system and a method to extract dominant color information using fusion of color space data. The color space data may include Red, Green, Blue (RGB) color space data and may include Hue (H), Saturation (S), and Intensity Value (V) color space data. Red, Green and Blue color space histograms may be computed and maximum count values of each color space may be obtained, which may help finding 'shine' information in the object. Normalized HSV color space may be fused with Normalized RGB color space for dominant color determination. The dominant color decision conditions involved in the fusion process may change based on a 'shine' flag.

15 Claims, 11 Drawing Sheets
(2 of 11 Drawing Sheet(s) Filed in Color)

FUSION OF COLOR SPACE DATA TO EXTRACT DOMINANT COLOR

CROSS REFERENCE TO RELATED APPLICATIONS

This application claims priority to India Patent Application No. 1060/DEL/2005, filed Apr. 29, 2005, which is incorporated herein by reference.

FIELD

The disclosed subject matter relates generally to the technical field of dominant color extraction.

BACKGROUND

In image analysis and processing, image attributes and feature extraction play an important role. These features generally fall into two major categories, i.e., primary and secondary, based on the way these features are analyzed or used by the human visual system in understanding the scene content. One of the prominent primary features used very often for pattern analysis and recognition by the human visual system includes color, for example, dominant color extraction. Hence, a variety of applications such as object classification, representation, query, content-based image, video indexing, video retrieval, medical image analysis, and bio-metrics, for example, derive inputs from accurate color analysis.

Though human eye perceives the dominant color very easily, automatic extraction of dominant color from video and/or image data may be challenging due to a variety of complexities, such as illumination variations, shadows, glossy surfaces, improper data capture, and reflections. The reflections may be caused by light reflecting from vehicle windshields and windows. Further, complexities of extracting dominant color may be challenging when the object includes multiple colors, for example, graffiti written on a side of a taxi. The object color as seen by the camera may change over the object area. The object color may vary depending on velocity and camera angle. The object color may not show-up clearly in case of far-field objects. The object color in case of humans may be arbitrary depending on dress.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

Embodiments of the present invention are illustrated by way of example and not limitation in the Figures of the accompanying drawings, in which like references indicate similar elements and in which.

DETAILED DESCRIPTION

According to one embodiment, a system and a method are described. A system and a method to extract dominant color information using fusion of color space data. The color space data may include Red, Green, Blue (RGB) color space data and may include Hue (H), Saturation (S), and Intensity Value (V) color space data.

The dominant color may be defined as the true color of the largest area corresponding to the object. For example, the dominant color of a yellow bus with black windows may be determined to be "YELLOW" in analysis embodiments, although black may also be prominent.

In the following description, for purposes of explanation, numerous specific details are set forth in order to provide a thorough understanding of embodiments of the present invention. It will be evident, however, to one skilled in the art that embodiments of the present invention may be practiced without these specific details.

Figure 1:
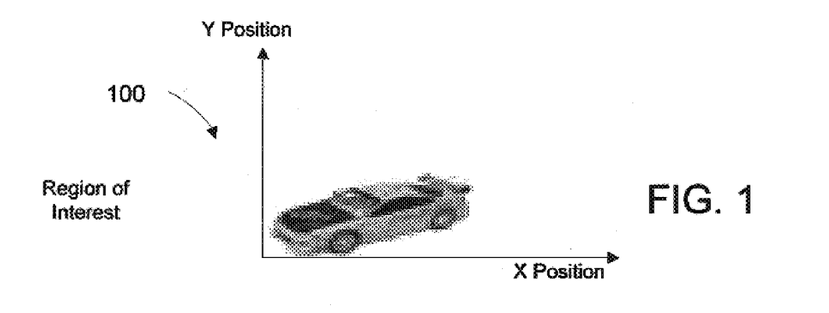
FIG. 1 illustrates a diagram depicting a region of interest, according to an example embodiment of the present invention.

FIG. 1 illustrates a diagram depicting a region of interest 100, according to an example embodiment of the present invention. The region of interest 100 may be an object in a video image.

Figure 2:
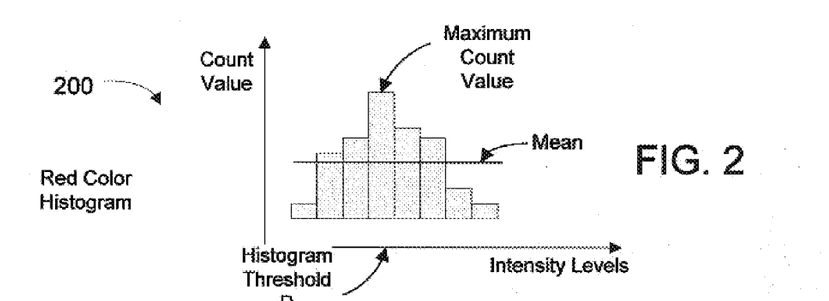
FIG. 2 illustrates a red color histogram associated with the region of interest of FIG. 1, according to an example embodiment of the present invention.

FIG. 2 illustrates a red color histogram 200 associated with the region of interest of FIG. 1, according to an example embodiment of the present invention. The axes of the histogram include a count value along the y-axis and an intensity level, grouped as "n" bins, along the x-axis. The intensity levels or bins represent the red color component variations in the object The count value corresponds to how many intensity values occur in each intensity bin (e.g. count of pixels with specific range of Red Color Intensity values in the sample object) A mean value of the count value may be shown through the histogram. A maximum count value may be indicated in the histogram. A histogram threshold R may be indicated at the position corresponding to the maximum count value.

Figure 3:
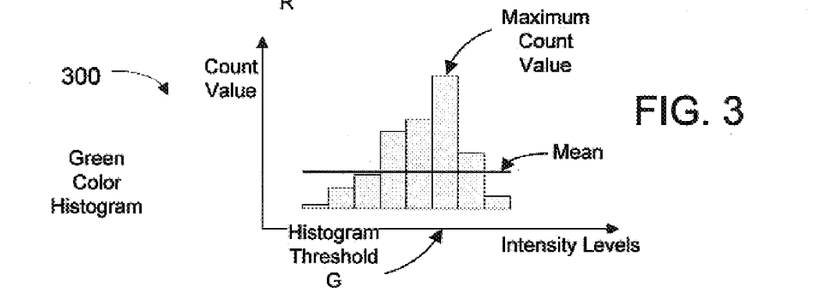
FIG. 3 illustrates a green color histogram associated with the region of interest of FIG. 1, according to an example embodiment of the present invention.

FIG. 3 illustrates a green color histogram 300 associated with the region of interest of FIG. 1, according to an example embodiment of the present invention. Similar to FIG. 2, the axes of the histogram include a count value along the y-axis and an intensity level, grouped as "n" bins, along the x-axis. The intensity bins represent the green color component variations in the object. The count value corresponds to how many intensity values occur in each intensity bin (e.g. count of pixels with specific range of Green Color Intensity values in the sample object). A mean value of the count value may be shown through the histogram. A maximum count value may be indicated in the histogram. A histogram threshold G may be indicated at the position corresponding to the maximum count value.

Figure 4:
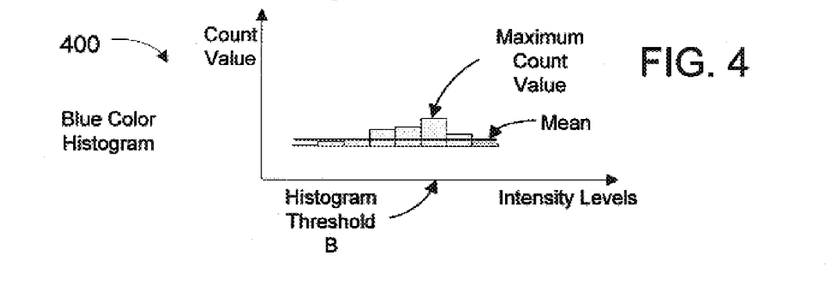
FIG. 4 illustrates a blue color histogram associated with the region of interest of FIG. 1, according to an example embodiment of the present invention.
Figure 5:
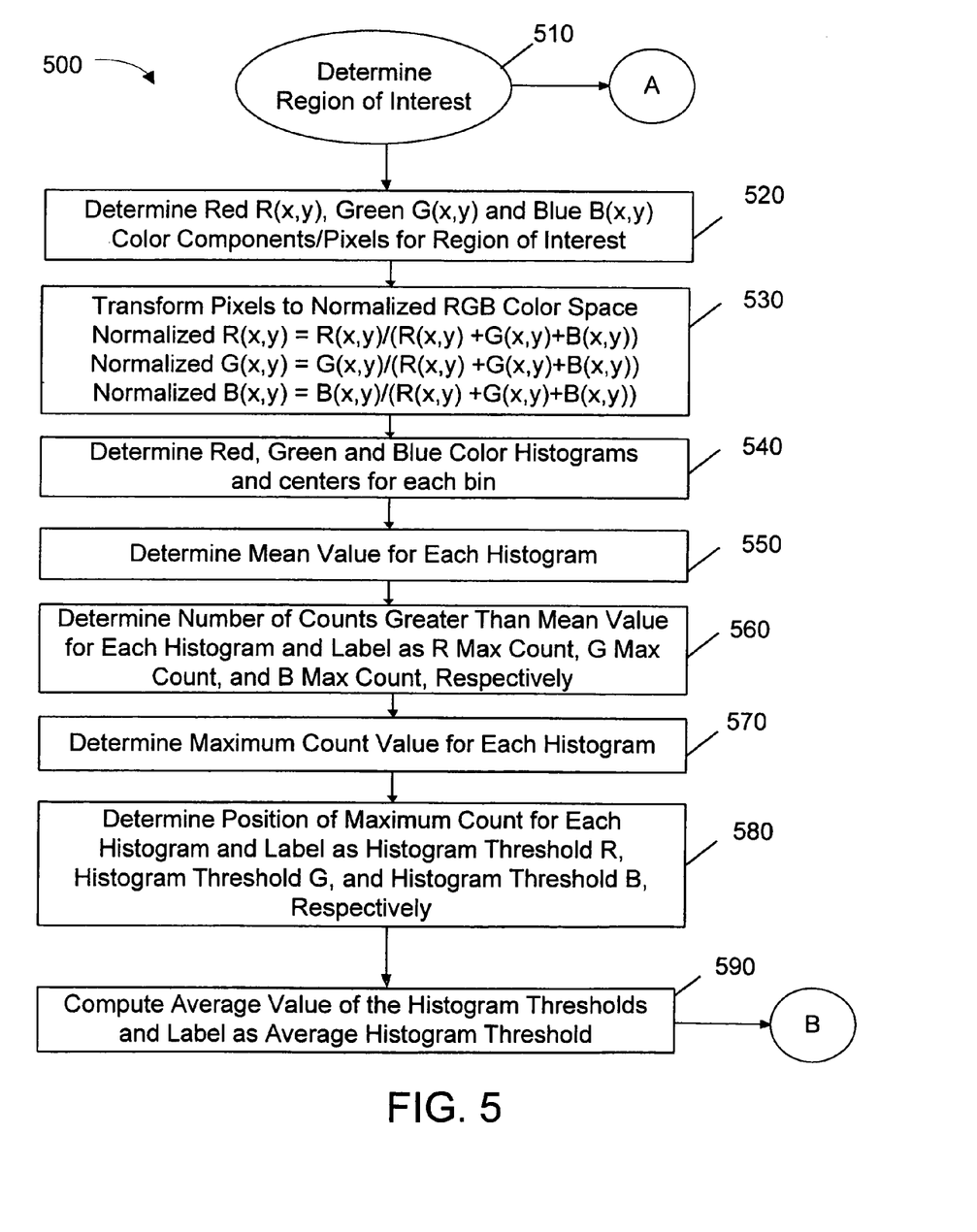
FIG. 5 illustrates a flow chart of a method describing RGB color space analysis, according to an example embodiment of the present invention.

FIG. 4 illustrates a blue color histogram 400 associated with the region of interest of FIG. 1, according to an example embodiment of the present invention. Similar to FIGS. 2 and 3, the axes of the histogram include a count value along the y-axis and an intensity level, grouped as "n" bins, along the x-axis. The intensity bins represent the blue color component variations in the object. The count value corresponds to how many intensity values occur in each intensity bin (e.g. count of pixels with specific range of Blue Color Intensity values in the sample object). A mean value of the count value may be shown through the histogram. A maximum count value may be indicated in the histogram. A histogram threshold B may be indicated at the position corresponding to the maximum count value Flowcharts FIG. 5 illustrates a flow chart of a method 500 describing RGB color space analysis, according to an example embodiment of the present invention. A first stage of extracting dominant color may include normalizing red, blue, green (RGB) color space analysis.

At block 510, the region of interest is determined. The method 500 may split to method 600 of FIG. 6, method 700 of FIG. 7, and/or may proceed to block 520.

At block 520, red (R(x, y)), green (G(x, y)), and blue (B(x, y)) color components and/or pixels for the determined region of interest may be determined.

At block 530, pixels of the object may be transformed into the normalized RGB color space using the transformations given below:

Normalized $R(x,y)=R(x,y)/(R(x,y)+G(x,y)+B(x,y))$;

Normalized $G(x,y)=G(x,y)/(R(x,y)+G(x,y)+B(x,y))$;

Normalized $B(x,y)=B(x,y)/(R(x,y)+G(x,y)+B(x,y))$;

At block 540, red, green, and blue color histograms (shown for example in FIGS. 2, 3, and 4) may be determined. A bin width of corresponding R, G and B color histograms may be determined, and may be calculated using the normalized RGB color space. Further, the centers ("n" bin centers) for each of the "n" bins may be determined.

At block 550, the mean values of the histograms may be obtained for R, G and B colors, respectively, as shown in FIGS. 2, 3, and 4.

At block 560, the histogram counts greater than the mean value may be determined for R, G, and B histograms, respectively. The number of counts may be labeled as "R Max Count", "G Max Count" and "B Max Count," respectively.

At block 570, a maximum count value for each histogram may be determined.

At block 580, an index and/or position of the maximum count for R, G, and B may be determined and may be referred to as "Histogram Threshold R", "Histogram Threshold G" and "Histogram Threshold B."

At block 590, an average value of the "Histogram Thresholds" found in block 580 may be computed. The average value may be an "Average Histogram Threshold" used in further analysis with regard to FIGS. 8A to 8E, the next step in the method.

Figure 6:
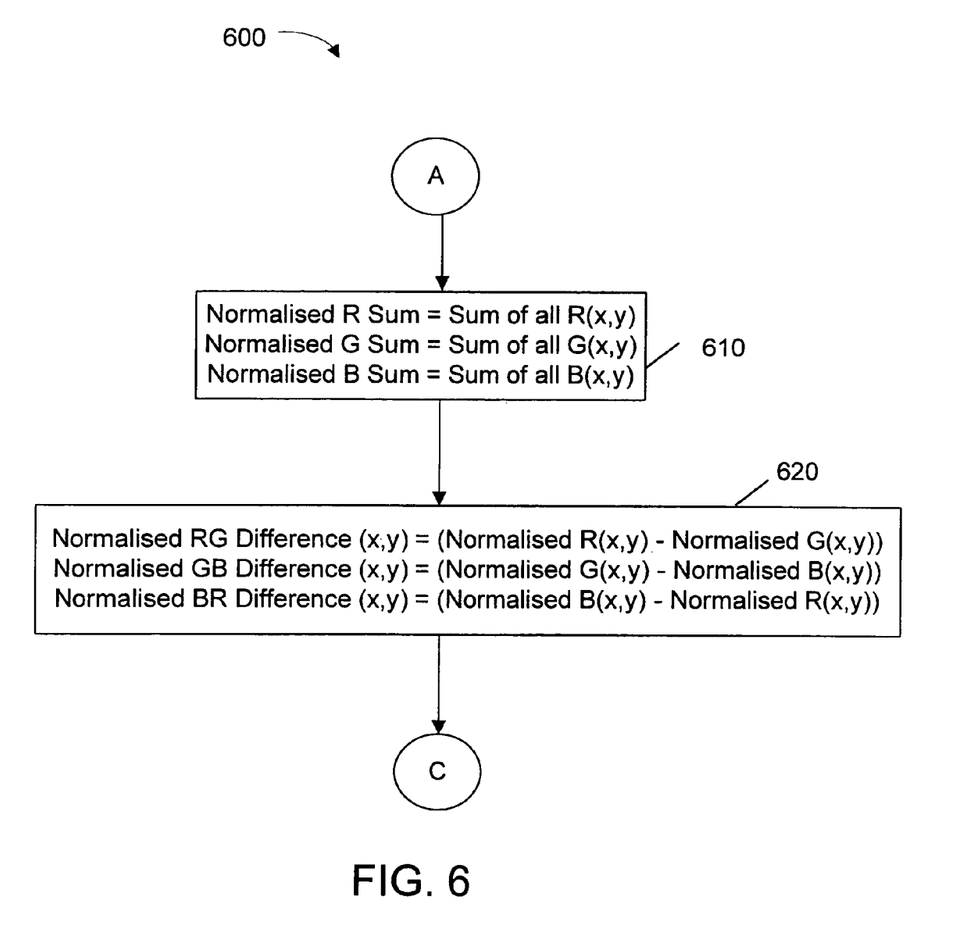
FIG. 6 illustrates a flow chart of a method describing normalized RGB color space analysis, according to an example embodiment of the present invention.

FIG. 6 illustrates a flow chart of a method 600 describing normalized RGB color space analysis, according to an example embodiment of the present invention. A second stage of extracting dominant color may include RGB Sum and Difference Analysis and may be considered a first chromaticity factor.

At block 610, sums of the Normalized R, G and B color component images may be computed using the following equations:

Normalized $R$ Sum=Sum of all $R(x,y)$;

Normalized $G$ Sum=Sum of all $G(x,y)$;

Normalized $B$ Sum=Sum of all $B(x,y)$;

At block 620, differences of the normalized colors may be calculated as follows:

Normalized $RG$ Difference$(x,y)$=(Normalized $R(x,y)$–Normalized $G(x,y)$);

Normalized $GB$ Difference$(x,y)$=(Normalized $G(x,y)$–Normalized $B(x,y)$); and Normalized $BR$ Difference$(x,y)$=(Normalized $B(x,y)$–Normalized $R(x,y)$).

Figure 8A:
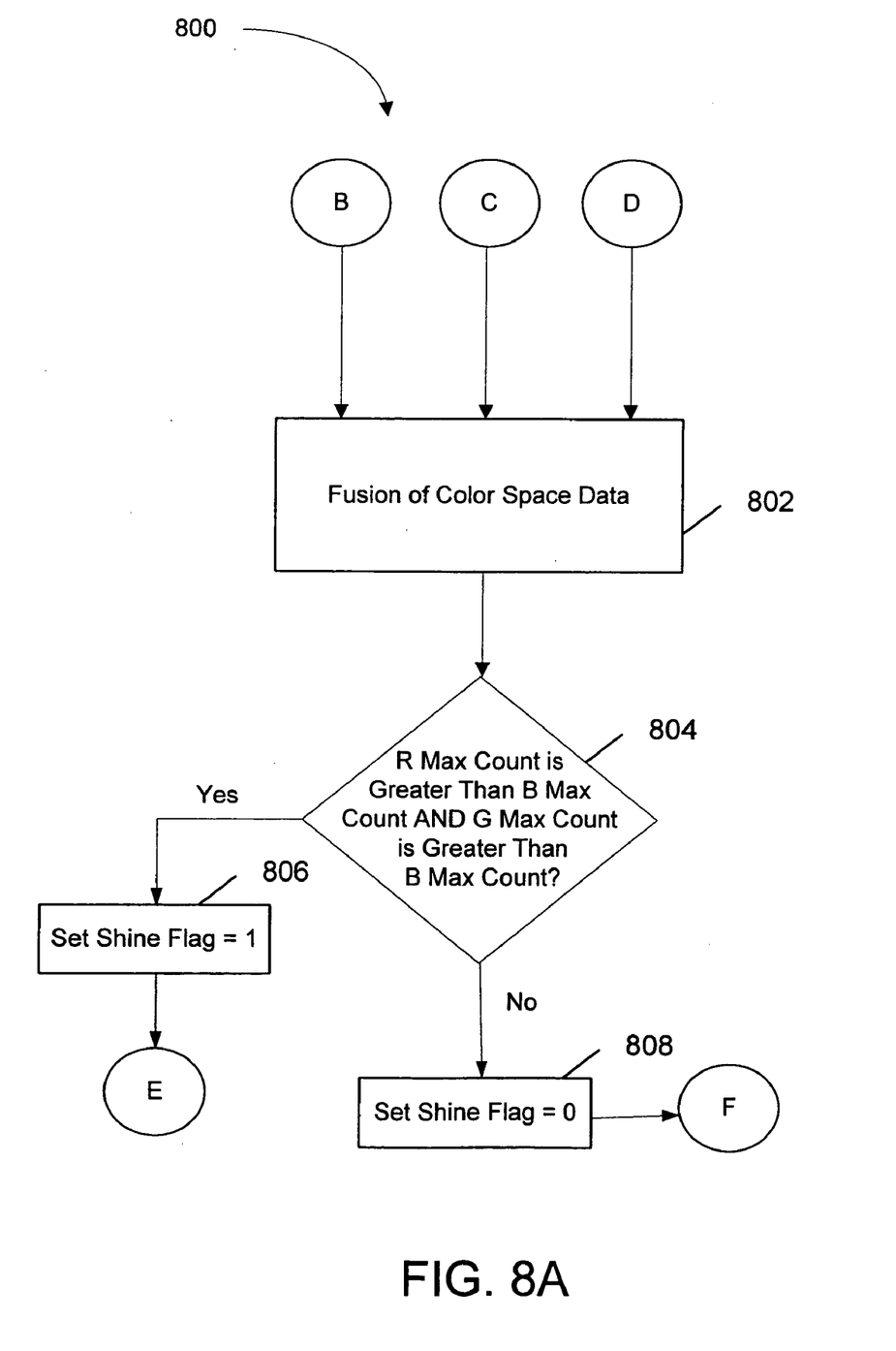
FIGS. 8A to 8E illustrate a flow chart of a method describing dominant color decision analysis for shiny and non-shiny objects, according to an example embodiment of the present invention.

The method 600 may continue at FIG. 8A.

Figure 7:
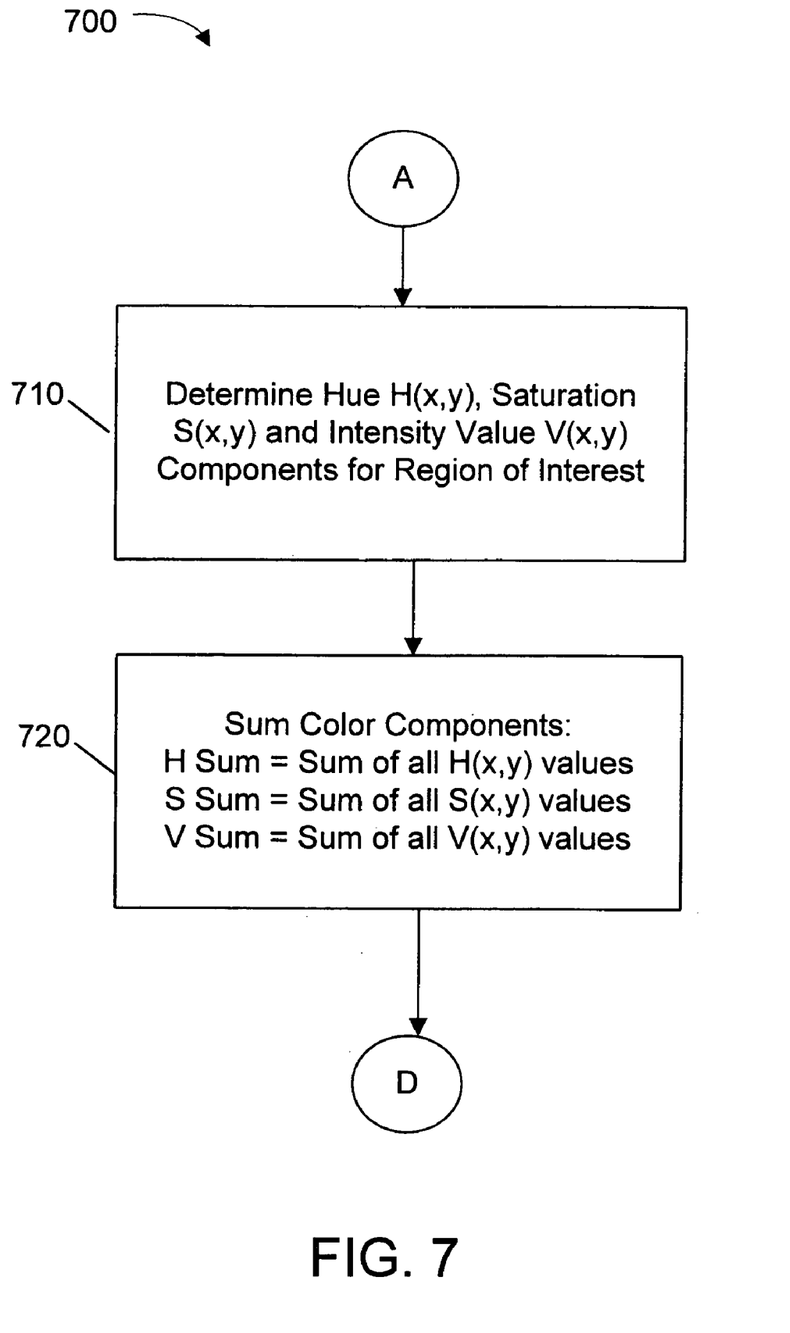
FIG. 7 illustrates a flow chart of a method describing HSV color space analysis, according to an example embodiment of the present invention.

FIG. 7 illustrates a flow chart of a method 700 describing HSV color space analysis, according to an example embodiment of the present invention. A third stage of extracting dominant color may include HSV color space sum analysis and may be considered a second chromaticity factor identified based on sum and difference of the perceptual aspects.

At block 710, hue (H), saturation (S) and Intensity Value (V) color components of the HSV (or HSI) color space may be obtained. The color components may be H(x, y), S(x, y), and V(x, y), respectively. The components may be obtained from the RGB color components using the standard conversion procedures. A sample of the standard conversion procedure is shown in the table below.

| $\Theta_x$ RGB→HSV | |
|---|---|
| var_R = ( R / 255 ) | //RGB values = From 0 to 255: |
| var_G = ( G / 255 ) | |
| var_B = ( B / 255 ) | |
| var_Min = min( var_R, var_G, var_B ) | //Min value of RGB |
| var_Max = max( var_R, var_G, var_B ) | //Max value of RGB |
| del_Max = var_Max − var_Min | //Delta RGB value |
| V = var_Max | |
| if ( del_Max == 0 ) | //This is a gray, no chroma... |
| ( | |
|   H = 0 | //HSV results = From 0 to 1 |
|   S = 0 | |
| ) | |
| else | //Chromatic data... |
| ( | |
|   S = del_Max / var_Max | |
|   del_R = ( ( ( var_Max − var_R ) / 6 ) + ( del_Max / 2 ) ) / del_Max | |
|   del_G = ( ( ( var_Max − var_G ) / 6 ) + ( del_Max / 2 ) ) / del_Max | |
|   del_B = ( ( ( var_Max − var_B ) / 6 ) + ( del_Max / 2 ) ) / del_Max | |
|   if      ( var_R == var_Max ) H = del_B − del_G | |
|   else if ( var_G == var_Max ) H = ( 1 / 3 ) + del_R − del_B | |
|   else if ( var_B == var_Max ) H = ( 2 / 3 ) + del_G − del_R | |
|   if ( H < 0 ) , H += 1 | |
|   if ( H > 1 ) , H −= 1 | |
| ) | |

At block 720, the summation of the H, S and V color components may be calculated using the following equations:

$$H\text{ Sum} = \text{Sum of all values } H(x,y);$$

$$S\text{ Sum} = \text{Sum of all values } S(x,y); \text{ and}$$

$$V\text{ Sum} = \text{Sum of all values } V(x,y).$$

The method 700 may continue at FIG. 8A.

FIGS. 8A to 8E illustrate a flow chart of a method 800 describing dominant color decision analysis for shiny and non-shiny objects, according to an example embodiment of the present invention.

FIG. 8A illustrates a flow chart of the method 800, according to an example embodiment of the present invention. A fourth stage of extracting dominant color may include object shine analysis.

At block 802, color space data may be gathered. The color space data may have been generated in methods 500, 600, and/or 700 and used to determine dominant color of the object or region of interest.

At block 804, the method 800 queries whether the object has a shiny surface. The object has a shiny surface if the following condition is satisfied: "R Max Count and G Max Count are greater than B Max Count."

If the condition is satisfied at block 806, then a "Shine Flag" is set to "1" and the object is considered shiny. The process then proceeds to FIG. 8B.

If the condition is not satisfied at block 808, the "Shine Flag" to "0" and the object is considered non-shiny. The process then proceeds to FIG. 8D.

FIGS. 8B to 8E illustrate a flow chart of a method to determine a dominant color, according to an example embodiment of the present invention. A fifth stage of extracting dominant color may include fusing together information of the previous stages and analyzing the information.

Figure 8B:
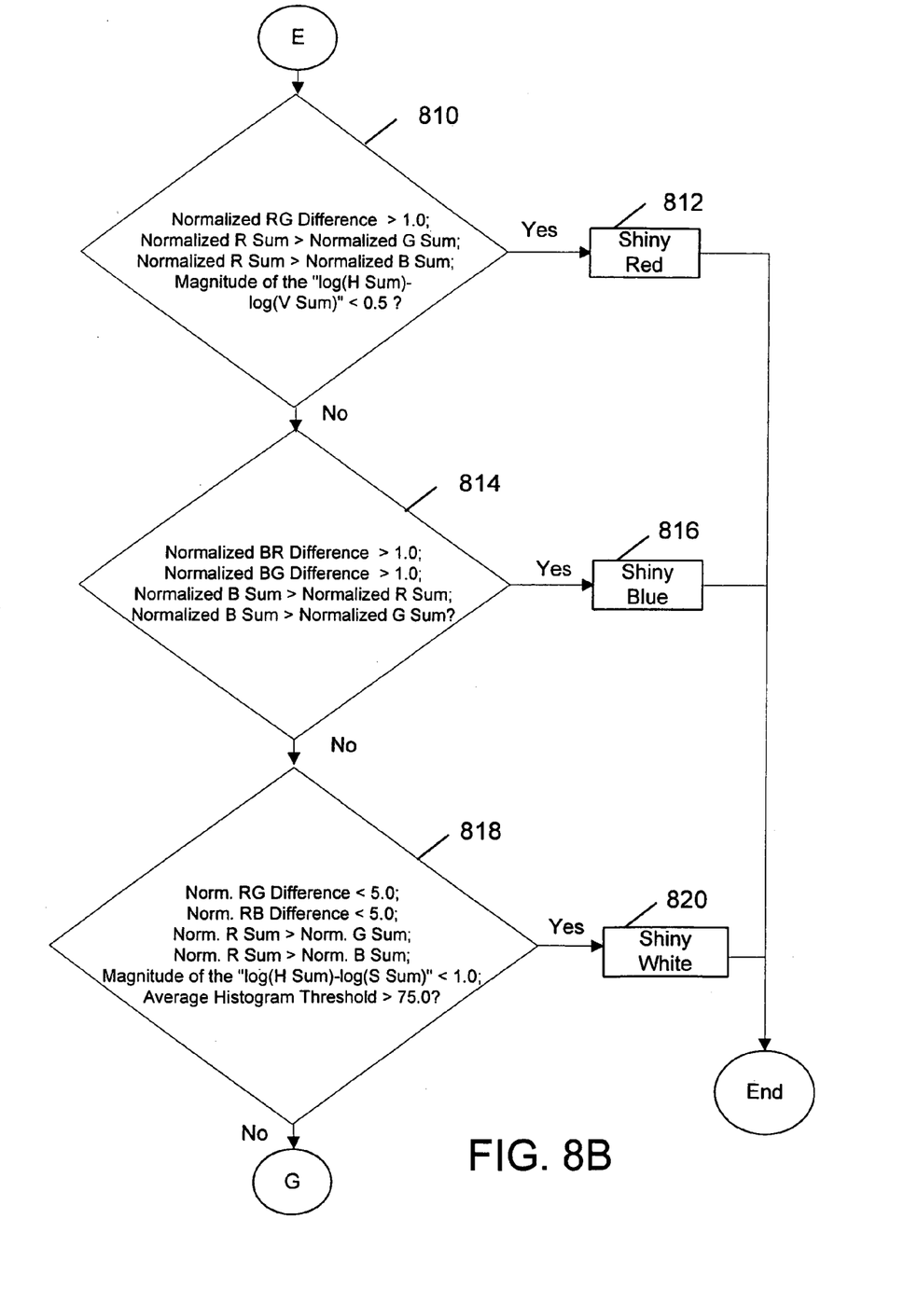
Figure 8C:
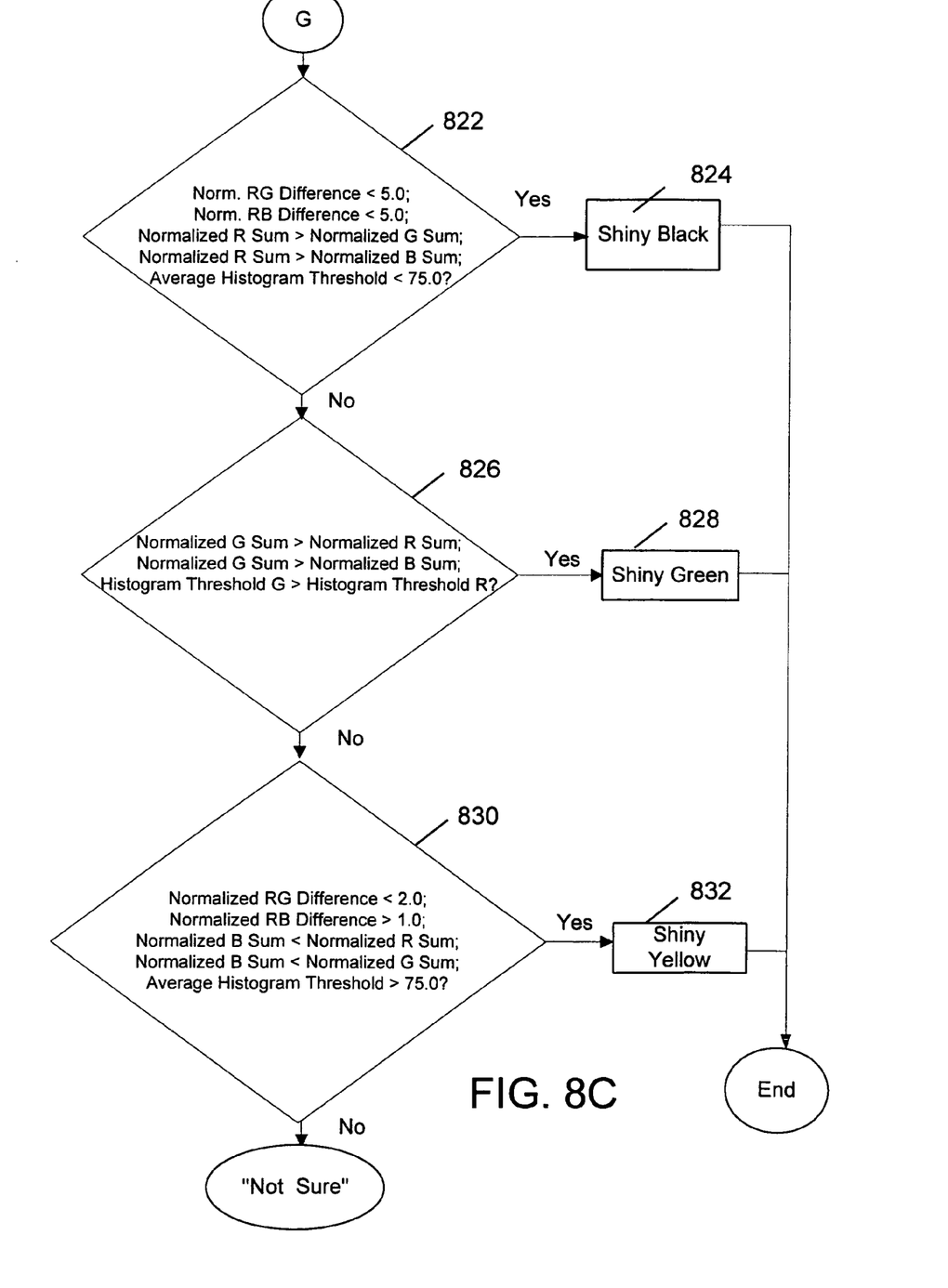
Figure 8D:
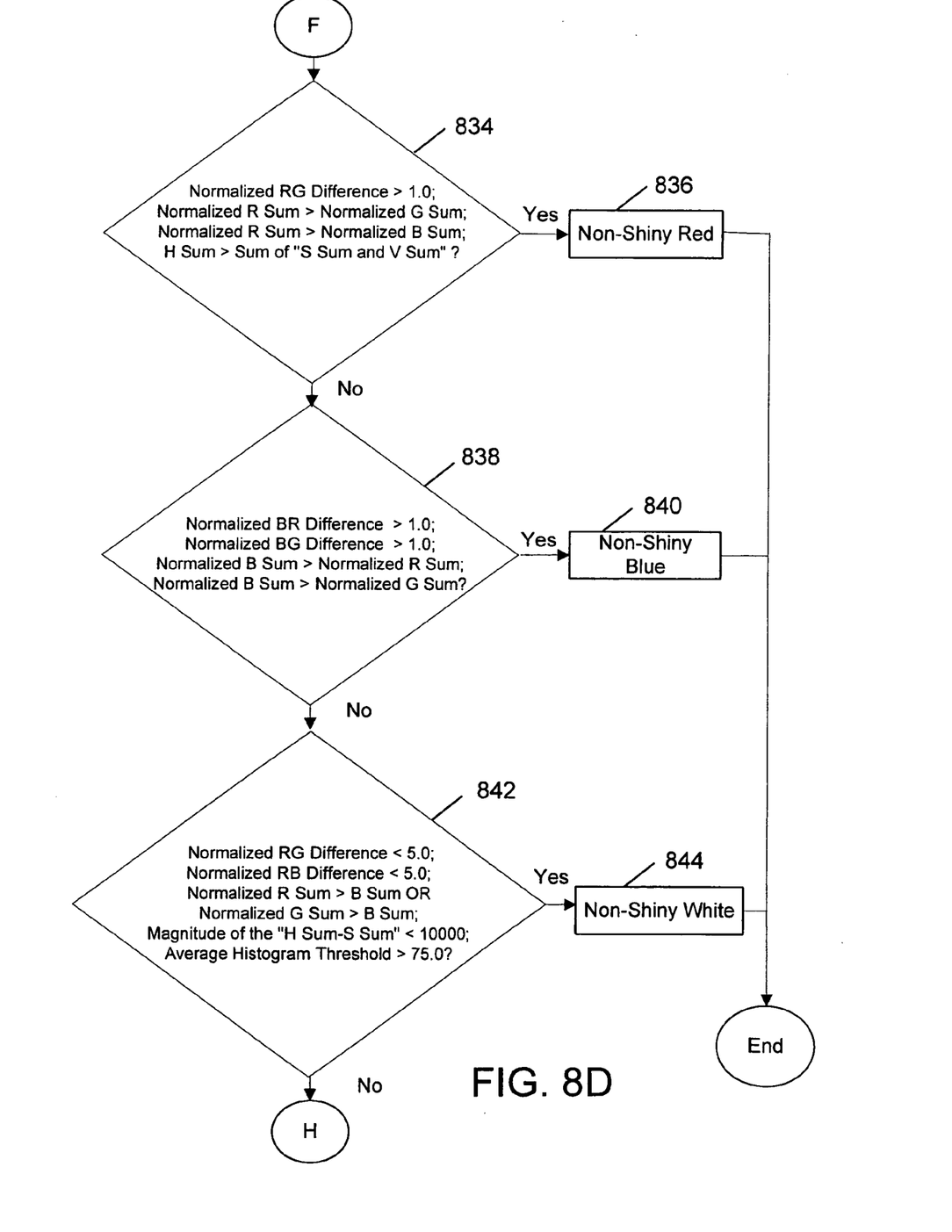
Figure 8E:
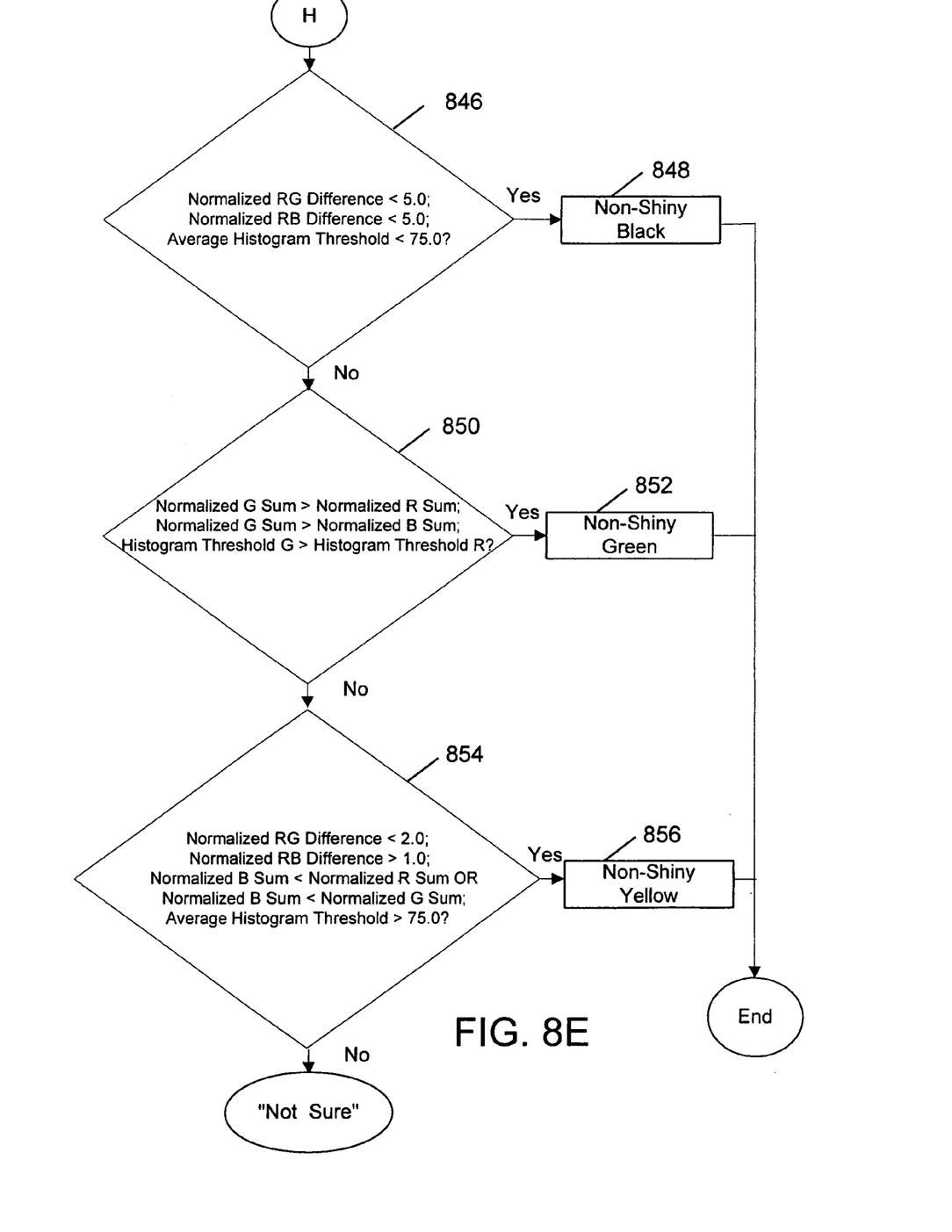

Joint-condition statements are applied in FIGS. 8B to 8E using results obtained from the RGB Color Space Analysis of FIG. 5, the RGB Difference Analysis of FIG. 6, and the HSV Color Space Analysis of FIG. 7 to decide the dominant object color. FIGS. 8B and 8C illustrate the method to determine dominant color for shiny objects. FIGS. 8D and 8E illustrate the method to determine dominant color for non-shiny objects.

At block 810, the dominant color is RED at block 812 if the following (predetermined) conditions are met:
  i) Normalized RG Difference>1.0;
  ii) Normalized R Sum>Normalized G Sum;
  iii) Normalized R Sum>Normalized B Sum; and
  iv) Magnitude of the "log(H Sum)–log(V Sum)"<0.5.

If the above conditions are not met, the method proceeds to block 814.

At block 814, the dominant color is BLUE at block 816 if the following conditions are met:
  i) Normalized BR Difference>1.0;
  ii) Normalized BG Difference>1.0;
  iii) Normalized B Sum>Normalized R Sum; and
  iv) Normalized B Sum>Normalized G Sum.

If the above conditions are not met, the method proceeds to block 818.

At block 818, the dominant color is WHITE at block 820 if the following conditions are met:
  i) Normalized RG Difference<5.0;
  ii) Normalized RB Difference<5.0;
  iii) Normalized R Sum>Normalized G Sum;
  iv) Normalized R Sum>Normalized B Sum;
  v) Magnitude of the "log(H Sum)–log(S Sum)"<1.0; and
  vi) Average Histogram Threshold>75.0.

If the above conditions are not met, the method proceeds to block 822.

At block 822, the dominant color is BLACK at block 824 if the following conditions are met:
  i) Normalized RG Difference<5.0;
  ii) Normalized RB Difference<5.0;
  iii) Normalized R Sum>Normalized G Sum;
  iv) Normalized R Sum>Normalized B Sum; and
  v) Average Histogram Threshold<75.0.

If the above conditions are not met, the method proceeds to block 826.

At block 826, the dominant color is GREEN at block 828 if the following conditions are met:
  i) Normalized G Sum>Normalized R Sum;
  ii) Normalized G Sum>Normalized B Sum; and
  iii) Histogram Threshold G>Histogram Threshold R.

If the above conditions are not met, the method proceeds to block 830.

At block 830, the dominant color is YELLOW at block 832 if the following conditions are met:
  i) Normalized RG Difference<2.0;
  ii) Normalized RB Difference>1.0;
  iii) Normalized B Sum<Normalized R Sum;
  iv) Normalized B Sum<Normalized G Sum; and
  v) Average Histogram Threshold>75.0.

If the above conditions are not met, the system generates a message indicating that it does not have clarity of what the object's dominant color is. Hence, the system may further output a message, such as "Not Sure of Dominant Color."

At block 834, the dominant color is RED at block 836, if the following conditions are met:
  i) Normalized RG Difference>1.0;
  ii) Normalized R Sum>Normalized G Sum;
  iii) Normalized R Sum>Normalized B Sum; and
  iv) H Sum>Sum of "S Sum and V Sum".

If the above conditions are not met, the method proceeds to block 838.

At block 838, the dominant color is BLUE at block 840 if the following conditions are met:
  i) Normalized BR Difference>1.0;
  ii) Normalized BG Difference>1.0;
  iii) Normalized B Sum>Normalized R Sum; and
  iv) Normalized B Sum>Normalized G Sum.

If the above conditions are not met, the method proceeds to block 842.

At block 842, the dominant color is WHITE at block 844 if the following conditions are met:
  i) Normalized RG Difference<5.0;
  ii) Normalized RB Difference<5.0;
  iii) Normalized R Sum>Normalized B Sum;
  iv) Normalized G Sum>Normalized B Sum;
  v) Magnitude of the H Sum–S Sum<10,000; and
  vi) Average Histogram Threshold>75.0.

If the above conditions are not met, the method proceeds to block 846.

At block 846, the dominant color is BLACK at block 848 if the following conditions are met:
  i) Normalized RG Difference<5.0;
  ii) Normalized RB Difference<5.0; and
  iii) Average Histogram Threshold<75.0.

If the above conditions are not met, the method proceeds to block 850.

At block 850, the dominant color is GREEN at block 852 if the following conditions are met:
  i) Normalized G Sum>Normalized R Sum;
  ii) Normalized G Sum>Normalized B Sum; and
  iii) Histogram Threshold G>Histogram Threshold R.

If the above conditions are not met, the method proceeds to block 854.

At block 854, the dominant color is YELLOW at block 856 if the following conditions are met:

i) Normalized RG Difference<2.0;
ii) Normalized RB Difference>1.0;
iii) Normalized B Sum<Normalized R Sum or Normalized B Sum<G Sum; and
iv) Average Histogram Threshold>75.0.

If the above conditions are not met, the system generates a message indicating that it does not have clarity of what the object's dominant color is. Hence, the system may further output a message, such as "Not Sure of Dominant Color."

Output

Figure 9:
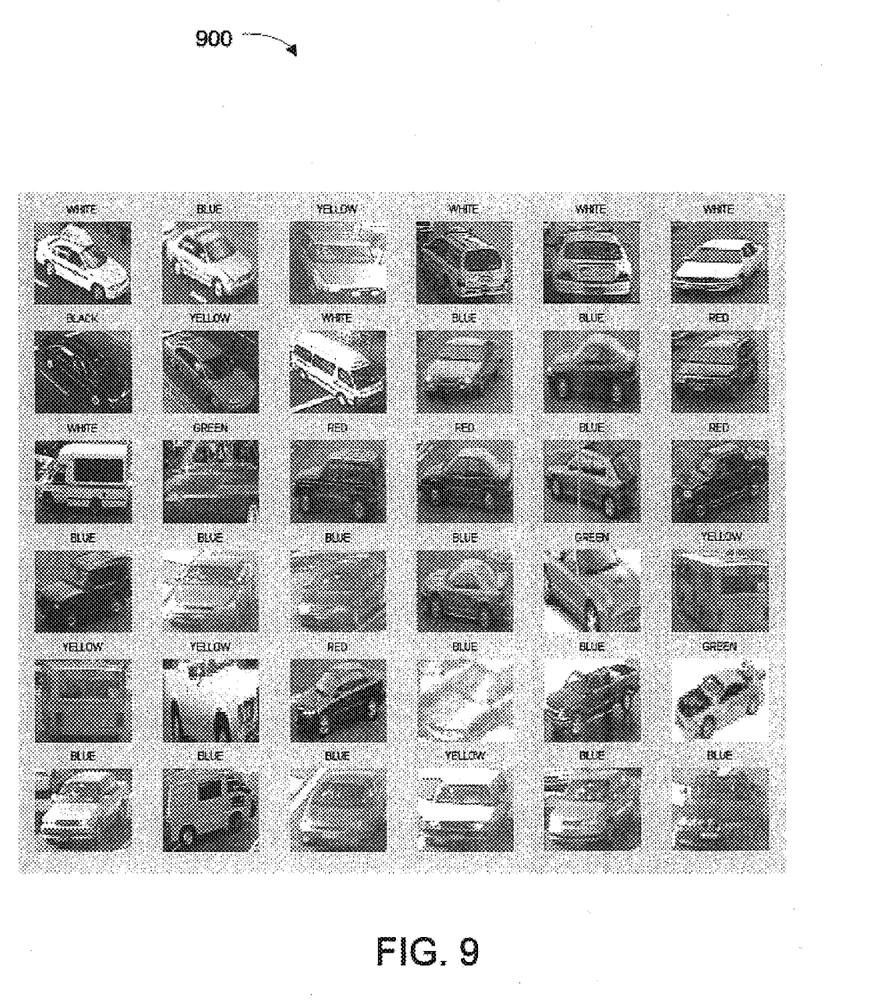
FIG. 9 illustrates an output obtained using the flowchart of FIGS. 8A to 8E according to an example embodiment of the present invention.

FIG. 9 illustrates an output 900 obtained using the flowchart of FIGS. 8A to 8E according to an example embodiment of the present invention.

The output illustrates a sample set of color objects, within a region of interest (ROI), drawn from video data. Objects may be obtained as segmented regions from a video sequence using any standard motion estimation and/or detection techniques. Analysis may be performed for image or color based segmentation. Vehicles of different colors, types and shapes are illustrated. Sample results of associated dominant color analysis are illustrated as a title of each object.

The analysis and flowcharts described herein may be used in video-based surveillance. The color analysis may refer to the specific "object" (the pre-determined region of interest in the image or video frame) of interest only and not to the full frame, because the dominant color of the targeted object may be quantified for enabling intelligent surveillance to provide object description such as "Detect a Blue Vehicle Entering the Parking Lot."

Computer System

Figure 10:
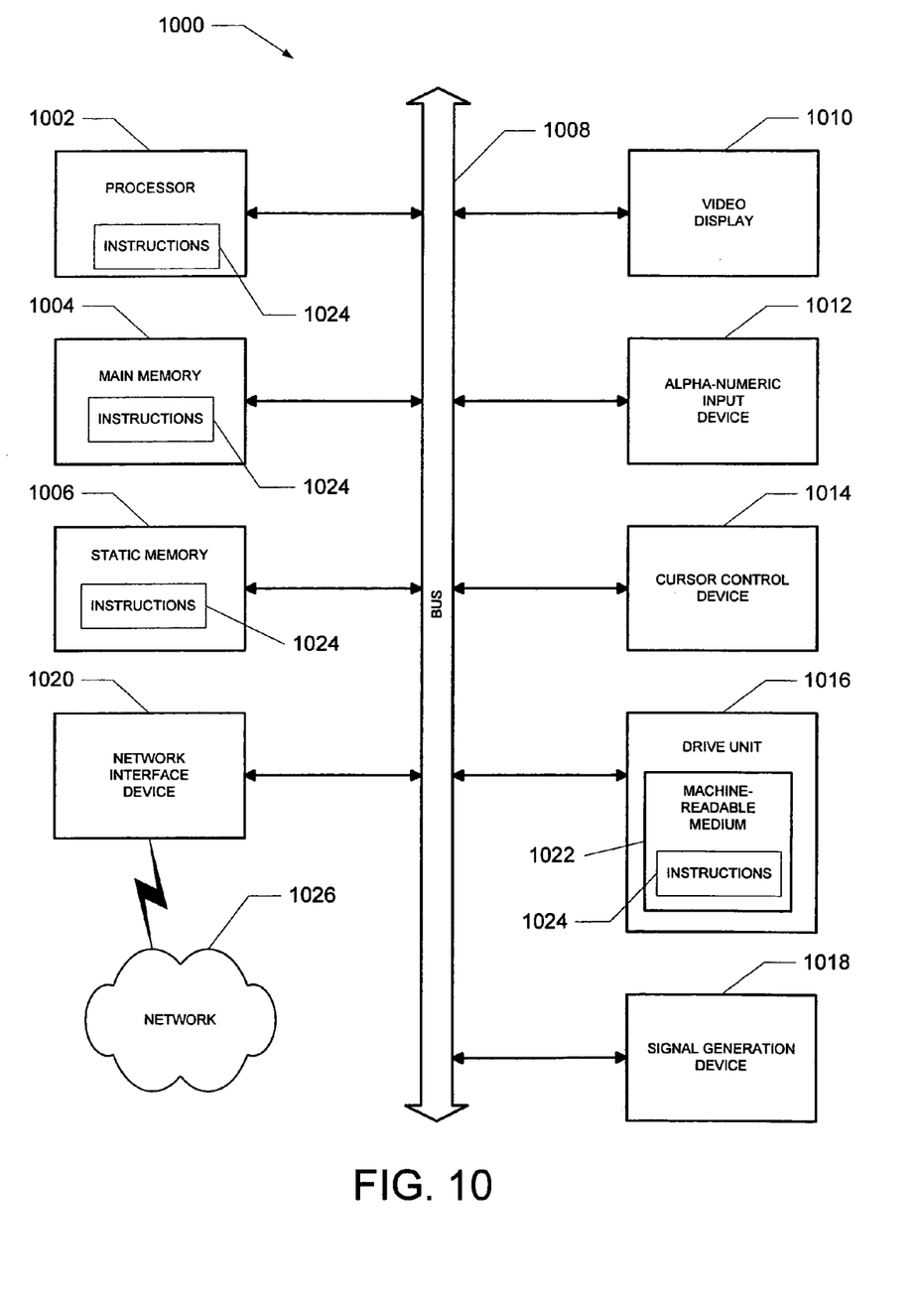
FIG. 10 illustrates a diagrammatic representation of a machine in the form of a computer system within which a set of instructions, for causing the machine to perform any one or more of the methodologies discussed herein, may be executed, according to an example embodiment.

FIG. 10 shows a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., network) to other machines. In a network deployment, the machine may operate in the capacity of a server or a client user machine in server-client user network environment, or as a peer machine in a peer-to-peer (or distributed) network environment. The machine may be a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media.

The instructions 1024 may further be transmitted or received over a network 1026 via the network interface device 1020.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, or encoding a set of instructions for execution by the machine and that cause the machine to perform any one or more of the methodologies of the present invention. The term "machine-readable medium" shall accordingly be taken to include, but not be limited to, solid-state memories, optical and magnetic media.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. FIGS. 1 to 10 are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. § 1.74 (b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, embodiments describe a method and a system to extract dominant color information using fusion of color space data. An example method comprises: analyzing color space of the object to generate color histograms; analyzing color difference of the object to generate normalized color difference data; analyzing hue, saturation and intensity value color space of the object to generate hue, saturation, and intensity value sum data; and fusing together the color histograms, the normalized color difference data and the hue, saturation, and intensity value sum data. Analyzing color space of the object to generate color histograms may include determining components of specific colors of the object; transforming the color components to normalized color space for each specific color; generating a histogram of the normalized color space for each specific color; determining a maximum count value and its corresponding position for each histogram; determining a mean value for each histogram; determining a number of counts greater than mean value for each histogram; and computing an average value of their positions. Analyzing color difference of the object to generate normalized color difference data may include calculating a normalized sum of the color components for each specific color; and calculating a difference between the normalized color space of a first color and the normalized color space of a second color.

Analyzing hue, saturation and intensity value color space of the object to generate hue, saturation, and intensity value sum data may include determining hue, saturation, and intensity value components for the object; and calculating a sum of each of the hue, saturation, and intensity value components.

Fusing together the color histograms, the normalized color difference data and the hue, saturation, and intensity value sum data may include determining whether the object is shiny or non-shiny; and determining a dominant object color based on the analyzed color space, the analyzed color difference, and the analyzed hue, saturation and intensity value color space.

A system may comprise means for generating normalized red, green, blue color space components of an object; means for generating red, green and blue color histograms of the object; means for generating normalized hue, saturation, and intensity value components of the object; means for determining a dominant color of the object using the generated normalized components and histograms. The dominant color may include a color of a largest area corresponding to the object. The dominant color may be selected from a group including red, green, blue, yellow, white and black.

A method to identify predominant color of an object in an image may comprise extracting red, green and blue color pixels; performing a color space analysis based on normalization of the red, green and blue color pixels; identifying a first chromaticity factor across pixels based on sum and difference of the normalized red, green and blue color pixels; transforming the color components to a color space representing perceptual aspects of the image; identifying a second chromaticity factor based on sum and difference of the perceptual aspects; and determining predominant color of the object based on at least one predetermined condition using the first and second chromaticity factors. The predominant color may be selected from a group including red, green, blue, yellow, white and black. The dominant color may include a color of a largest area of the object. The method may further comprise segmenting the image based on color. The first chromaticity factor may include calculating a normalized sum of the color components for each specific color; and calculating a difference between the normalized color space of a first color and the normalized color space of a second color. The second chromaticity factor may include analyzing hue, saturation and intensity value color space of the object to generate hue, saturation, and intensity value sum data; determining hue, saturation, and intensity value components for the object; and calculating a sum of each of the hue, saturation, and intensity value components.

A machine-readable medium stores a sequence of instructions that, when executed by a computer, may cause the computer to perform any of the above-described methods.

Although embodiments of the present invention have been described with reference to specific example embodiments, it will be evident that various modifications and changes may be made to these embodiments without departing from the broader spirit and scope of embodiments as expressed in the subjoined claims.

What is claimed is:

1. A tangible machine-readable medium storing a sequence of instructions that, when executed by a computer, cause the computer to determine dominant color of object by performing:
   analyzing, via the computer, color space of the object to generate color histograms;
   analyzing, via the computer, color difference of the object to generate normalized color difference data;
   analyzing, via the computer, hue, saturation and intensity value color space of the object to generate hue, saturation, and intensity value sum data; and
   fusing together, via the computer, the color histograms, the normalized color difference data and the hue, saturation, and intensity value sum data,
   wherein analyzing color space of the object to generate color histograms includes:
      determining components of specific colors of the object; and
      transforming the color components to normalized color space for each specific color.

2. The tangible machine-readable medium of claim 1 wherein analyzing color space of the object to generate color histograms further includes:
   generating a histogram of the normalized color space for each specific color;
   determining a maximum count value and its corresponding position for each histogram;
   determining a mean value for each histogram;
   determining a number of counts greater than mean value for each histogram; and
   computing an average value of their positions.

3. The tangible machine-readable medium of claim 2 wherein analyzing color difference of the object to generate normalized color difference data includes:
   calculating a normalized sum of the color components for each specific color; and
   calculating a difference between the normalized color space of a first color and the normalized color space of a second color.

4. The tangible machine-readable medium of claim 1 wherein analyzing hue, saturation and intensity value color space of the object to generate hue, saturation, and intensity value sum data includes:

determining hue, saturation, and intensity value components for the object; and calculating a sum of each of the hue, saturation, and intensity value components.

5. The tangible machine-readable medium of claim 1 wherein fusing together the color histograms, the normalized color difference data and the hue, saturation, and intensity value sum data includes:

determining whether the object is shiny or non-shiny; and determining a dominant object color based on the analyzed color space, the analyzed color difference, and the analyzed hue, saturation and intensity value color space.

6. A tangible machine-readable medium storing a sequence of instructions that, when executed by a computer, cause the computer to perform:

generating normalized red, green, blue color space components of an object;

generating red, green and blue color histograms of the object;

generating normalized hue, saturation, and intensity value components of the object; and determining a dominant color of the object using the generated normalized components and histograms by determining a maximum count value and its corresponding position for each histogram;

determining a mean value for each histogram;

determining a number of counts greater than mean value for each histogram; and computing an average value of their positions.

7. The tangible machine-readable medium of claim 6 wherein the dominant color includes a color of a largest area corresponding to the object.

8. The tangible machine-readable medium of claim 6 wherein the dominant color is selected from a group including red, green, blue, yellow, white and black.

9. A computer implemented method to identify predominant color of an object in an image, the method comprising:

using one or more processors to execute instructions retained in machine-readable medium to perform at least some portion of the following:

extracting red, green and blue color pixels;

performing a color space analysis based on normalization of the red, green and blue color pixels;

identifying a first chromaticity factor across pixels based on sum and difference of the normalized red, green and blue color pixels;

transforming the color components to a color space representing perceptual aspects of the image;

identifying a second chromaticity factor based on sum and difference of the perceptual aspects;

determining predominant color of the object based on at least one predetermined condition using the first and second chromaticity factors; and presenting determined predominant color of the object to a user.

10. The computer implemented method of claim 9 wherein the predominant color is selected from a group including red, green, blue, yellow, white and black.

11. The computer implemented method of claim 9 wherein the dominant color includes a color of a largest area of the object.

12. The computer implemented method of claim 9 further comprising segmenting the image based on color.

13. The computer implemented method of claim 9 wherein the first chromaticity factor includes calculating a normalized sum of the color components for each specific color; and calculating a difference between the normalized color space of a first color and the normalized color space of a second color.

14. The computer implemented method of claim 9 wherein the second chromaticity factor includes analyzing hue, saturation and intensity value color space of the object to generate hue, saturation, and intensity value sum data; determining hue, saturation, and intensity value components for the object; and calculating a sum of each of the hue, saturation, and intensity value components.

15. A tangible machine-readable medium storing a sequence of instructions that, when executed by a computer, cause the computer to:

extract red, green and blue color pixels;

perform a color space analysis based on normalization of the red, green and blue color pixels;

identify a first chromaticity factor across pixels based on sum and difference of the normalized red, green and blue color pixels;

transform the color components to a color space representing perceptual aspects of the image;

identify a second chromaticity factor based on sum and difference of the perceptual aspects; and determine predominant color of the object based on at least one predetermined condition using the first and second chromaticity factors.

* * * * *

UNITED STATES PATENT AND TRADEMARK OFFICE
CERTIFICATE OF CORRECTION

PATENT NO. : 7,606,414 B2  Page 1 of 1
APPLICATION NO. : 11/223224
DATED : October 20, 2009
INVENTOR(S) : Boregowda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 997 days.

Signed and Sealed this

Twelfth Day of October, 2010

David J. Kappos
*Director of the United States Patent and Trademark Office*